Dec. 18, 1962    J. W. TAMPLEN    3,068,890
FLUID PRESSURE SYSTEMS AND PILOT VALVES THEREFOR
Filed Dec. 24, 1958    2 Sheets-Sheet 1

INVENTOR.
JACK W. TAMPLEN
BY
Mellin and Hanscom
ATTORNEYS

Dec. 18, 1962  J. W. TAMPLEN  3,068,890
FLUID PRESSURE SYSTEMS AND PILOT VALVES THEREFOR
Filed Dec. 24, 1958  2 Sheets-Sheet 2

INVENTOR.
JACK W. TAMPLEN
BY
Mellin and Hanscom
ATTORNEYS

United States Patent Office 3,068,890
Patented Dec. 18, 1962

3,068,890
FLUID PRESSURE SYSTEMS AND PILOT VALVES THEREFOR
Jack W. Tamplen, Celina, Tex., assignor to Otis Engineering Corporation, Dallas, Tex., a corporation of Delaware
Filed Dec. 24, 1958, Ser. No. 782,758
4 Claims. (Cl. 137—494)

This invention relates to fluid pressure systems wherein pilot valves are employed to exhaust a fluid pressure operated device to atmosphere in response to a variation in fluid pressure from a predetermined amount, and more particularly to such systems wherein the pilot valve operates by snap action between its open and closed positions.

An example of such a system is that illustrated and described in Patent No. 2,566,772, issued to H. C. Otis, wherein a main control valve is connected in a gas line, with the main control valve being held open by a valve operator actuated by the gas pressure in the line. When the gas pressure rises or falls outside of a predetermined range of pressures, a pilot valve exhausts the main valve operator to atmosphere, causing the main control valve to close. After the correction of the trouble which had caused the abnormal pressure condition, the pilot valve is reset, and the main control valve is reopened to allow flow through the gas line.

An object of the present invention is to provide a pilot valve which operates automatically to vent a fluid filled chamber to atmosphere upon the occurrence of a predetermined pressure within said chamber.

Another object of the invention is to provide an automatically resettable pilot valve operable in response to variations of pressure.

A further object of the invention is to provide a pressure responsive pilot valve which operates between open and closed positions by snap action.

A still further object is to provide a pressure actuated pilot valve which has a valve member operable to exhaust fluid under pressure to atmosphere and in which a relatively small force is required to move the valve member to open position.

A more specific object is to provide a pressure actuated pilot valve having a valve member seated on a valve seat in which the upstream side of the valve member is exposed to a fluid under pressure and the downstream side of the valve member is open to atmosphere and in which the valve member is moved by snap action away from the valve seat by a force considerably less than that imposed on the valve member by the fluid under pressure and in response to a departure in pressure of said fluid from a predetermined amount.

Another object is to provide a system using a pilot valve as set forth in the preceding objects wherein the pilot valve exhausts a pressure fluid device to atmosphere in response to the presence of a predetermined minimum pressure in said device.

Yet another object is to provide a system as set forth in the last object wherein the pilot valve serves as a relief valve to limit the high pressure within the pressure fluid device to a predetermined maximum amount.

A further object is to provide a system wherein a pilot valve as set forth above will exhaust a fluid pressure operated device to atmosphere in response to a predetermined low reference pressure.

Another object is to provide a system wherein a pilot valve as set forth above will exhaust a fluid pressure operated device to atmosphere in response to a predetermined high reference pressure.

Yet another object is to provide a system wherein a pilot valve as set forth above will supply fluid under pressure from a source of fluid to a pressure operated device when the pressure of said source is above a predetermined amount and wherein the pilot valve will exhaust the pressure operated device to atmosphere if the pressure of said source falls below said predetermined pressure.

Other objects and advantages will become apparent in the course of the following detailed description.

In the drawings, forming a part of this application, and in which like parts are designated by like reference numerals throughout the same, FIG. 1 is a sectional view, with parts shown in elevation, of a pilot valve mechanism constructed in accordance with the invention.

Figure 1:
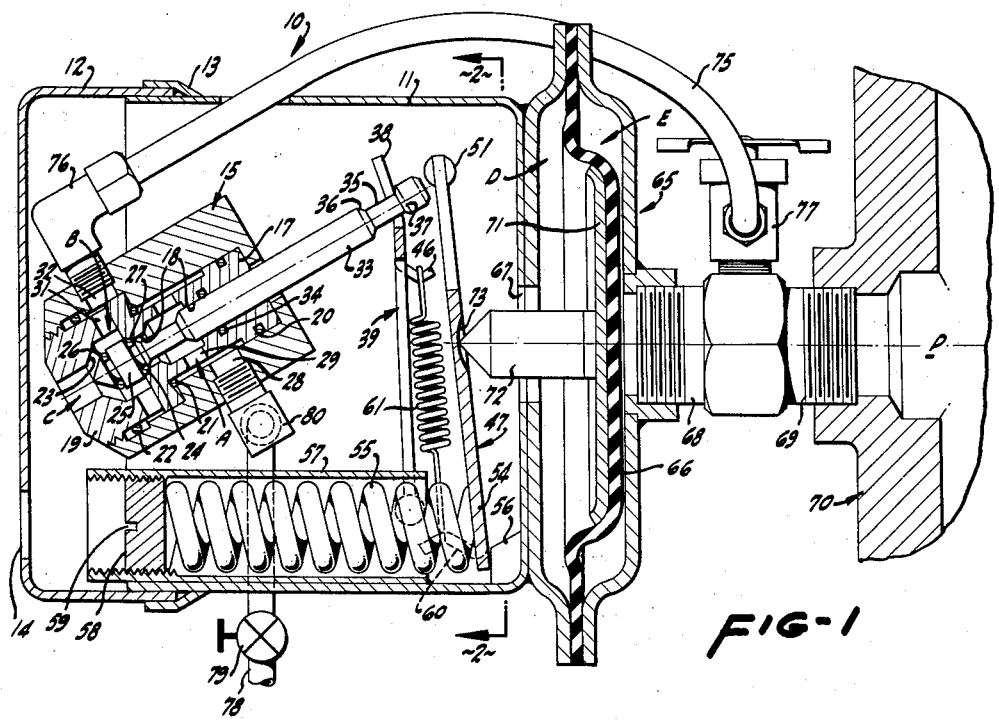
Figure 2:
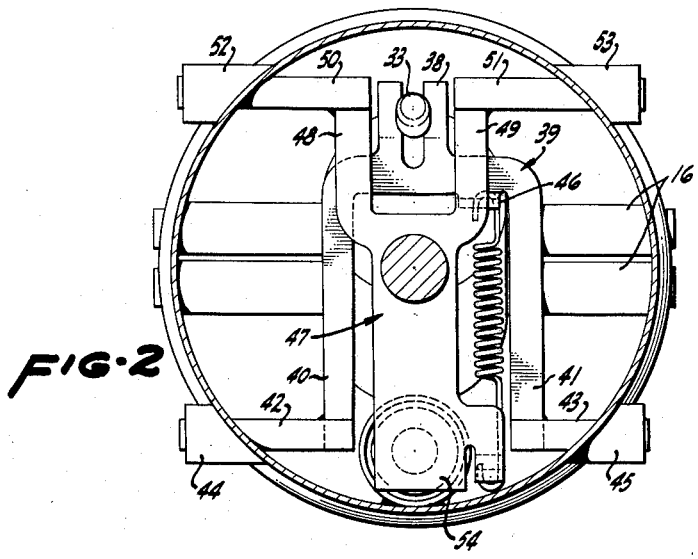
FIG. 2 is a sectional view, taken on the line 2—2 of FIG. 1.

Referring now to the drawings, and particularly to FIGS. 1 and 2 thereof, the pilot valve, generally indicated by the reference numeral 10, comprises a generally cylindrical casing 11 having a rear cover plate 12 telescoped thereonto and held there by frictional engagement with the casing lugs 13. The rear cover plate 12 is provided with an opening 14 for insertion of a screwdriver therethrough and to maintain the interior of casing 11 at atmospheric pressure.

A valve body 15 is mounted within casing 11, as by mounting studs 16 extending from the valve body to the casing. The valve body 15 includes a core piece 17 having a bore 18 there-through, the core piece being held securely in place within the valve body by retainer 19. O-rings 20 and 21 seal the core piece to the valve body, and O-ring 22 seals the retainer 19 to the valve body.

The retainer 19 has a valve seat face 23 formed thereon, forming a part of the bore 18 through the valve body, and the core piece has a valve seat face 24 formed thereon, facing the valve seat face 23. A shuttle valve member 25 is disposed within bore 18 for reciprocatory movement between valve seats 23 and 24, and has O-rings 26 and 27 therearound which alternatively engage the valve seats 23 and 24, respectively.

A first passage A is provided through the valve body into bore 18 and comprises fluidly communicating valve body and core piece ports 28 and 29. A second passage B is provided through the valve body into the bore 18 and comprises fluidly communicating valve body and core piece ports 31 and 32, and a third passage C is provided through the retainer 19 into bore 18. As is seen in the drawings, the intermediate passage B opens into bore 18 between the valve seats 23 and 24, passage A opens into the bore on the right side of valve seat 24, and passage C opens into the bore on the left side of valve seat 23. Passage C, being in communication with the interior of casing 11, is thus open to atmosphere.

A valve stem 33, connected to valve member 25, extends through bore 18 and projects outwardly from the valve body. O-ring 34 seals the valve stem to the bore on the right side of passage A.

The right end of stem 33 has a reduced diameter neck portion 35 between shoulders 36 and 37 thereon, which neck is embraced by the bifurcated upper end 38 of lever 39. The lower portion of lever 39 is also bifurcated at 40 and 41 and is fixed to co-axial shafts 42 and 43, which are pivotally mounted to the casing 11 at 44 and 45. A spring support 46 is formed integrally on lever 39.

A second lever 47, having bifurcated upper end portions 48 and 49 fixed to co-axial shafts 50 and 51, is pivotally mounted to casing 11 at 52 and 53 for limited rotation about the axis defined by shafts 50 and 51. The lower end 54 of lever 47 is biased to the right (as seen in FIG. 1) by compression spring 55, with movement of the lever 47 to the right being limited by stop member 56.

Compression spring 55 is confined within an internally threaded cylindrical spring holder 57 fixed to casing 11, and bears against adjustment nut 58 threaded into the spring holder. A screwdriver slot 59 in the adjustment nut enables the nut to be threaded into or out of the spring holder so that the compressive force of spring 55 on lever 47 may be varied as desired.

The lower end of lever 47 is provided with a spring support 60 formed integrally therewith, and a stressed tension spring 61 is connected between the spring supports 46 and 60 on levers 39 and 47 respectively.

A diaphragm housing 65, secured to the right end of casing 11, has a flexible diaphragm 66 therein dividing the housing into chambers D and E. Chamber D is in fluid communication with the interior of casing 11 through port 67, so as to be at atmospheric pressure and chamber E constitutes an enclosed pressure chamber.

A tubing 68, connected to the diaphragm housing 65, so as to be in fluid communication with pressure chamber E, is provided with threads 69 for connection to a suitable fitting of a desired device 70 filled with fluid under pressure P.

A stiffening plate 71, secured to diaphragm 66, carries therewith a pointed plunger 72 extending through port 67 into engagement with the indented bearing surface 73 of lever 47.

Tubing 68 has connected thereto conduit 75 which is connected by fitting 76 to passage B of the valve body 15. A manually operable valve 77 in conduit 75 enables this conduit to be opened or closed, as desired. A conduit 78, having a manually operable valve 79 therein, is connected by fitting 80 to passage A of valve body 15.

Figure 3:
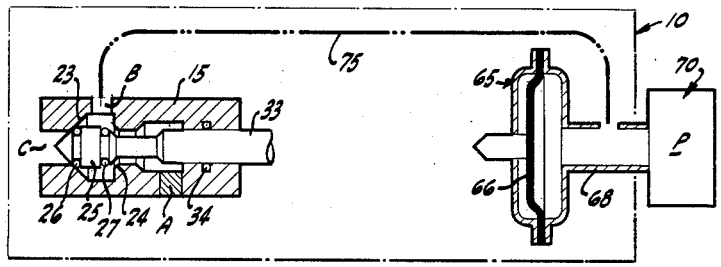
FIG. 3 is a schematic illustration of a fluid pressure system wherein the pilot valve of FIGS. 1 and 2 is used to vent a pressure source to atmosphere when the pressure of the source falls below a predetermined amount.

FIGS. 1 and 3 illustrate the use of the pilot valve in venting the pressure fluid P in device 70 to atmosphere when the fluid pressure therein falls below a predetermined minimum, with FIG. 1 illustrating the position of the parts when the fluid pressure P within device 70 is below this minimum amount. In this illustrated position, valve member 25 has been moved to the right so that device 70 is vented to atmosphere through tubing 68, conduit 75, and passages B and C to the interior of casing 11, and thus to atmosphere. Diaphragm chambers D and E are both at atmospheric pressure, so that the diaphragm 66 is forced to the right by the force of spring 55 on lever 47.

To reset the pilot valve 10 for operation, the manually operable valve 77 in conduit 75 is closed to prevent further venting of device 70 to atmosphere, and fluid pressure P is allowed to build up in this device. In addition, the manually operable valve 79 is closed to plug passage A.

The built up pressure P is exerted on diaphragm 66, urging this diaphragm to the left, and when the pressure is sufficient to overcome the preset force of spring 55, the diaphragm will move to the left, causing lever 47 to pivot in a clockwise direction about its axis of rotation (shafts 50 and 51). Such movement causes the spring support 60 of lever 47 to move from the right side of the plane defined by spring support 46 of lever 39 and the axis of rotation of lever 39 (shafts 42 and 43) to the left side of this plane.

Before this last movement, tension spring 61 exerted a force on lever 39 to the right thereof; i.e., urging lever 39 to rotate in a clockwise direction about its axis of rotation. Now, however, the spring 61 has moved to the left of shafts 42 and 43 and exerts a force on lever 39, causing it to rotate in a counterclockwise direction. This rotation causes the upper bifurcated end 38 of lever 39 to strike against stem shoulder 36 to move the stem to the left with a snap action so that the O-ring 26 of the valve member 25 now seats on valve seat 23, sealing passage B from passage C. The tension in spring 61 will hold the valve member 25 in its left position.

With passages B and C thus sealed from one another, the manually operable valve 77 is opened, placing the interior of device 70 and the diaphragm pressure chamber E in fluid communication with passage B. This is the position illustrated in FIG. 3.

The cross section of stem 33 where sealed by O-ring 34 to bore 18 is equal to the effective cross section of the valve member 25 where sealed by O-ring 26 to valve seat 23. As a consequence, the force of the pressure fluid in the bore 18 (entering from passage B) acting on the valve member and stem will be equal in both directions and will not cause any movement of the valve member 25 from or towards seating engagement with valve seat 23. Also, atmospheric pressure will exert equal forces on the right end of stem 33 and the left end of valve member 25. Thus, the atmospheric pressure and the pressure fluid forces will act in equal and opposite directions on the valve member and stem and the valve member will be held against valve seat 23 by the relatively weak force of spring 61 alone. Also, an increase or decrease in the pressure of the fluid in passage B will not affect the position of valve member 25.

The elements will remain in their last described position, as long as the pressure of the fluid P remain higher than the predetermined amount. If the pressure of this fluid falls below this amount, the force holding diaphragm 66 to the left will be insufficient to overcome the force thereon exerted by spring 55, and lever 47 will be moved counterclockwise about its pivots 52 and 53 by spring 55. This will cause the lower end of spring 61 to move back to the right of the pivot points 44 and 45 of lever 39, and this over center action will cause the lever 39 to rotate in a clockwise direction. The upper bifurcated end of lever 39 now strikes stem shoulder 37 to move the stem and valve member to the right, with a snap action, to the position illustrated in FIG. 1. Passage B is now in communication with passage C, thus allowing the pressure fluid P in device 70 to exhaust to atmosphere.

The device is later reset, when desired, by again closing valve 77 so that the pressure in device 70 may again build up, as above described. As is apparent, the pressure at which the pilot valve is operated can be varied as desired by changing the compressive force of spring 55 on lever 47 by an adjustment of nut 58 in the spring holder 57.

Figure 4:
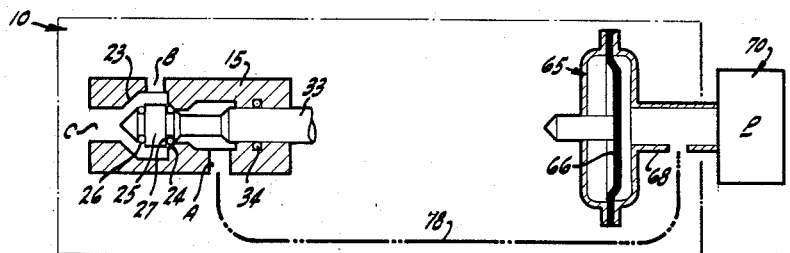
FIG. 4 is similar to FIG. 3 and illustrates the use of the pilot valve of FIG. 1 as a pressure relief device for a pressure source to vent the source to atmosphere when the pressure rises above a predetermined amount.

FIG. 4 illustrates the use of pilot valve 10 as a high pressure relief valve. In this system, passage A is connected by conduit 78 to tubing 68, passage B is opened to atmosphere by removing fitting 76 therefrom, and spring 55 is adjusted to force diaphragm 66 to the right with a desired force. As long as the pressure of pressure fluid P in device 70 is less than a predetermined force, diaphragm 66 will be held to the right by spring 55, and the valve member 25 and stem 35 will be held to the right by spring 61, in the position as shown in FIG. 1. The fluid pressure in passage A will be equal to that in device 70, and diaphragm chamber E. The cross section of the stem 33 where sealed by O-ring 34 to bore 18 is again equal to the effective cross section of valve member 25 where sealed by O-ring 27 to valve seat 24, so that there is again an equal force exerted in both directions on stem 33 and valve member 25 by the pressure fluid P, and the spring force of spring 61 alone holds the valve member against seat 24.

If the pressure of fluid P increases above the predetermined amount, diaphragm 66 will be forced to the left, against the force of spring 55, causing the valve member to move by snap action to the left, as above described. This places passages A and B in fluid communication, allowing pressure fluid P to exhaust to atmosphere. When the pressure of this fluid decreases sufficiently, the pressure in diaphragm chamber E will decrease and diaphragm 66 will be moved to the right by spring 55, snapping valve member 25 to the right, to again seal passage A from passage B. The elements will remain in this position until the pressure of fluid P again rises above the predetermined amount. Thus, the pilot valve 10 will maintain the pressure within device 70 at or below a value determined by the setting of spring 55.

Figure 5:
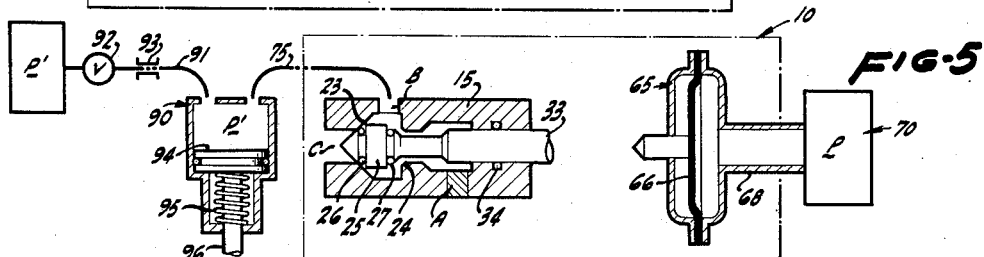
FIG. 5 is similar to FIG. 3 and illustrates the use of the pilot valve of FIG. 1 in venting a fluid pressure operated device to atmosphere if the fluid pressure in a reference pressure source falls below a predetermined low amount.

FIG. 5 illustrates the use of pilot valve 10 in venting an auxiliary pressure operated device if the pressure in device 70 falls below a predetermined value. In this system, the pressure of fluid P in device 70 is used merely as a reference pressure. An auxiliary pressure operated device 90 is supplied with pressure fluid by conduit 91 from a source of pressure P'. A valve 92 or restriction 93 may be used in conduit 91 to regulate the admission of pressure fluid P' into device 90. When the pressure within device 90 is sufficiently high, it will force piston 94 against the bias of spring 95 so that the piston stem 96 will move downwardly to perform a desired function.

In this system, device 90 is connected by conduit 75 to passage B of pilot valve 10, and passage A thereof is plugged, as by closing valve 79.

Now, whenever the reference pressure in device 70 is above a predetermined amount, valve member 25 will be in its left position, sealing against valve seat 23, as described above, which will prevent device 90 from venting to atmosphere. If the reference pressure in device 70 falls below the predetermined amount, the valve member 25 will snap to the right, venting device 90 to atmosphere. Spring 95 will then move piston 94 and piston stem 96 upwardly.

Device 90 will be automatically returned to operation whenever the reference pressure in device 70 returns above the predetermined minimum, for this reference pressure will then move diaphragm 66 to the left, causing valve member 25 to snap to the left, sealing passage B from atmosphere. A build up of pressure in device 90 will then cause the piston 94 and piston stem 96 to move downwardly.

Figure 6:
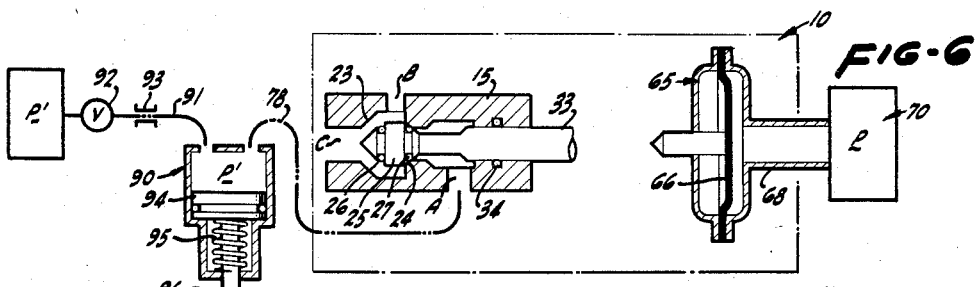
FIG. 6 is similar to FIG. 3, and illustrates the use of the pilot valve of FIG. 1 in venting a fluid pressure operated device to atmosphere if the fluid pressure in a reference pressure source rises above a predetermined amount.

FIG. 6 illustrates the system of FIG. 5, but with the pilot valve 10 arranged to vent the device 90 to atmosphere upon the presence of a predetermined high reference pressure in device 70. In this system, valve body passage B is opened to atmosphere, and valve body passage A is connected by conduit 78 to device 90.

When the reference pressure of fluid P is sufficiently low, diaphragm 66 will be moved to the right by spring 55, and valve member 25 will be in its right position, sealing against valve seat 24, so that device 90 will be prevented from bleeding to atmosphere. If the reference pressure increases sufficiently, it will move diaphragm 66 to the left, thereby allowing device 90 to vent through passages A and B to atmosphere. Device 90 will be automatically returned to operation when the pressure within device 70 decreases sufficiently to allow spring 55 to move the diaphragm 66 to the right, which will again seat valve member 25 on valve seat 24.

Figure 7:
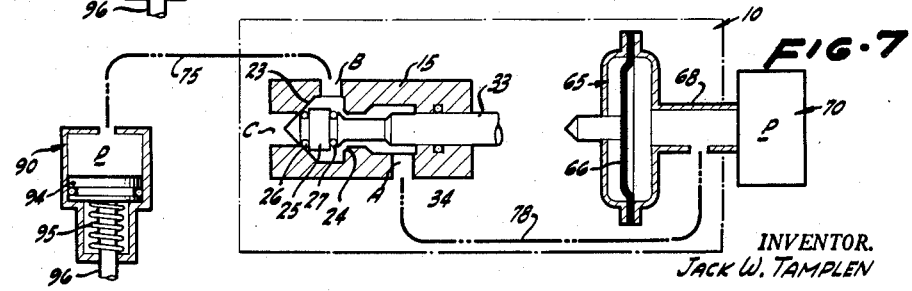
FIG. 7 is similar to FIG. 3, and illustrates the use of the pilot valve of FIG. 1 in automatically supplying a fluid pressure operated device with pressure fluid or in venting the fluid pressure operated device to atmosphere depending upon whether the fluid pressure in a pressure source is above or below a predetermined amount.

FIG. 7 illustrates the use of pilot valve 10 in a system wherein device 90 is supplied by pressure fluid P from device 70 and in which device 90 is vented to atmosphere whenever the pressure in device 70 falls below a predetermined minimum.

In this system, passage A of the valve body is connected by conduit 78 to tubing 68, and thus to the interior of device 70. Passage B is connected by conduit 75 to pressure device 90.

Whenever the pressure of fluid P in device 70 is above a predetermined amount, diaphragm 66 will be forced to the left, seating valve member 25 on valve seat 23, and placing passages A and B in fluid communication. Pressure fluid P is thus allowed to flow through conduits 78 and 75 to device 90, forcing the piston 94 therein downwardly against the bias of spring 95.

Now, if the pressure of fluid P decreases below the predetermined amount, diaphragm 66 will be forced to the right by spring 55, causing valve member 25 to snap to the right to seal against valve seat 24 and seal passage B from passage A. Passage B is now in communication with passage C and device 90 bleeds to atmosphere, allowing spring 95 therein to move piston 94 upwardly.

The piston 94 will be automatically moved downwardly whenever the pressure of fluid P in device 70 again rises above the predetermined amount, because the valve member 25 will be automatically returned to its left position by an increase of pressure in device 70. This, of course, again allows the pressure fluid P to actuate the device 90.

Thus, the position of device 90 will be dependent upon whether the pressure within device 70 is above or below the predetermined amount, and will move back and forth between these positions without resetting. It will be noted that, in this system, device 70 is not vented to atmosphere by pilot valve 10 at any time.

It is to be realized that the pilot valve illustrated and described is a preferred embodiment of the same and that various changes may be made in the size, shape and arrangement of parts without departing from the spirit of the invention or the scope of the attached claims. It is to be also realized that the systems shown and described are to be taken as preferred embodiments of the same and that these systems may be altered, with other components and arrangements being used, without departing from the spirit of the invention or the scope of the attached claims.

Having thus described my invention, what I claim and desire to secure by Letters Patent is:

1. Pilot valve apparatus comprising: a valve body having a bore therein and having first and second passages opening into said bore, a valve seat formed in said bore between said passages, a valve member movable in said bore into and out of seating engagement with said valve seat, a valve stem connected to said valve member, means sealing said valve stem to said bore on the side of said first passage remote from said second passage, the cross-sectional areas sealed by said valve with said valve seat and said stem sealing means being equal, a lever pivotally mounted for limited movement thereof about an axis fixed relative to said valve body, means connecting said lever and valve stem so that movement of said lever about its axis will move said valve member into and out of seating engagement with said valve seat, a spring support on said lever, said spring support and lever axis forming a plane transverse to the longitudinal axis of the valve stem, a movable member mounted for limited movement relative to said valve body, a spring support on said movable member movable between first and second positions on opposite sides of said plane, a first spring connected at its opposite ends to said spring supports, a second spring resiliently biasing said movable member spring support towards its first position, and means for moving said movable member spring support from its first to its second position.

2. A device as set forth in claim 1 wherein said last named means is responsive to fluid pressure and further including conduit means fluidly communicating said fluid responsive means with said first valve passage, said second valve passage being open to atmosphere, whereby an abnormal pressure in said fluid pressure responsive means will operate said valve member causing the pressure responsive means to be vented to atmosphere.

3. A device as set forth in claim 2 wherein said means connecting said lever to said valve stem provides a lost motion therebetween, causing said valve member to be snap activated into and out of seating engagement with said valve seat.

4. Apparatus for venting a pressure source upon detection of an abnormal pressure condition therein and comprising: a valve body having a bore therein and having first, second and third passages opening into said bore, valve seats formed in said bore between said first passage and each of said second and third passages, a valve means movable in said bore into alternative seating engagement with said valve seats, a valve stem connected to said valve means, means sealing said valve stem to said bore on the side of one of said second and third passages remote from said first passage, the cross-sectional area sealed by said valve means with each of said valve seats and the said stem sealing means all being equal, a lever pivotally mounted for limited movement thereof about an axis fixed relative to said valve body, means connecting said lever and valve stem so that movement of said lever about its axis will move said valve means between said valve seats, a spring support on said lever forming a plane with said axis, said plane being transverse to the longitudinal axis of the valve stem, a movable member mounted for limited movement relative to said valve body, a spring support on said movable member movable between opposite sides of said plane, a first spring connected at its opposite ends to said spring supports, a second spring resiliently biasing said movable member spring support towards one side of said plane, fluid pressure responsive means for moving said movable member spring support against the bias of said second spring to the other side of said plane, and conduit means fluidly communicating said fluid pressure responsive means with one of said first and second valve passages, one of the valve passages being open to atmosphere.

References Cited in the file of this patent
UNITED STATES PATENTS

| | | |
|---|---|---|
| 1,020,284 | James | Mar. 12, 1912 |
| 1,550,445 | Muller | Aug. 18, 1925 |
| 1,620,582 | Thrush | Mar. 8, 1927 |
| 1,953,433 | Replogle | Apr. 3, 1934 |
| 2,103,118 | Petroe | Dec. 21, 1937 |
| 2,328,902 | Grove | Sept. 7, 1943 |
| 2,382,710 | Haddock | Aug. 14, 1945 |
| 2,703,217 | Ashton | Mar. 1, 1955 |
| 2,814,310 | Lower | Nov. 26, 1957 |
| 2,814,447 | Greenamyer | Nov. 26, 1957 |
| 2,889,817 | Hard af Segerstad | June 9, 1959 |
| 2,934,090 | Kenann | Apr. 26, 1960 |
| 2,969,811 | Freeman | Jan. 31, 1961 |

FOREIGN PATENTS

| | | |
|---|---|---|
| 461,589 | Canada | Dec. 6, 1949 |
| 699,595 | Germany | Dec. 2, 1940 |
| 742,156 | France | Dec. 21, 1932 |
| 1,028,530 | France | Feb. 25, 1953 |